United States Patent [19]

Kobayashi et al.

[11] Patent Number: 4,909,585
[45] Date of Patent: Mar. 20, 1990

[54] OPTICAL COMMUNICATIONS APPARATUS

[75] Inventors: Toyohiro Kobayashi; Shoji Mukohara; Tatsunao Hayashida, all of Shizuoka; Yoshinori Numano, Amagasaki; Toshiyasu Higuma, Kamakura, all of Japan

[73] Assignee: Mitsubishi Denki Kabushiki Kaisha, Tokyo, Japan

[21] Appl. No.: 263,861

[22] Filed: Oct. 28, 1988

[30] Foreign Application Priority Data

Oct. 29, 1987 [JP] Japan ............... 62-273753
Nov. 19, 1987 [JP] Japan ............... 62-292861

[51] Int. Cl.⁴ ................ G02B 7/26; H04B 9/00
[52] U.S. Cl. ................... 350/96.16; 455/612
[58] Field of Search ............ 350/96.15, 96.16; 455/610, 612; 357/17, 19, 30

[56] References Cited

U.S. PATENT DOCUMENTS

| | | | |
|---|---|---|---|
| 3,883,217 | 5/1975 | Love et al. | 350/96.16 |
| 4,072,399 | 2/1978 | Love | 350/96.16 |
| 4,198,118 | 4/1980 | Porter | 350/96.16 |
| 4,246,475 | 1/1981 | Altman | 455/612 |
| 4,406,513 | 9/1983 | Raphael | 350/96.16 |
| 4,511,208 | 4/1985 | Ozeki et al. | 350/96.16 |
| 4,549,782 | 10/1985 | Miller | 350/96.16 |
| 4,732,446 | 3/1988 | Gipson et al. | 350/96.16 |

Primary Examiner—Frank Gonzalez
Attorney, Agent, or Firm—Oblon, Spivak, McClelland, Maier & Neustadt

[57] ABSTRACT

In an optical communications apparatus of one office having a light sending device which has a plurality of coupling ends adapted to be coupled with a light transmitting optical fiber for connecting individual offices and which sends a transmission signal in the form of light, and a light receiving device which receives a light signal; an optical communications apparatus comprising light sending means connecting the respective coupling ends and the light sending device through optical fibers, light receiving means connecting the respective coupling ends and the light receiving device through optical fibers, and pass-through means for passing the light signals between the coupling ends.

9 Claims, 8 Drawing Sheets

OPTICAL COMMUNICATIONS APPARATUS

BACKGROUND OF THE INVENTION

This invention relates to a communications apparatus employing optical fibers, and more particularly to an optical communications apparatus having a repeater station.

FIGS. 8 and 9 are plan views of a prior-art optical communications apparatus, more particularly to optical-branching communications apparatus (hereinbelow, termed the "first prior-art example") such as are described in, for example, the official gazette of Japanese Patent Application Laid-open No. 73225/1987 entitled "Optical switch." FIG. 8 shows the state in which a prism is inserted in the optical paths, while FIG. 9 shows the state in which the prism shown in FIG. 8 has been taken out of one of the optical paths.

FIG. 10 is an arrangement plan showing the optical transmission system of the first prior-art example. Hereinbelow, the expression "communications node" shall signify a communications equipment or a communications equipment office, which will also termed as simply an office.

In FIGS. 8 and 9, numeral 1 designates an optical switch including a transmission prism 2 which is movable so that, when any office has broken down, the prism can be removed from the optical path for that office. The optical switch 1 also includes an upper light input terminal 3, a lower light input terminal 4, a lower light output terminal 5 and an upper light output terminal 6. The prior-art system in FIG. 10 includes Office-B 7, Office-C 8, Office-D 9, Office-A 10 and an optical fiber 11. Throughout the drawings, the same symbols denote identical or equivalent portions.

Now, the operation of the first prior-art example will be described with reference to FIGS. 8, 9 and 10.

Referring to FIGS. 8 thru 10, the transmission prism 2 delivers light from the upper light input terminal 3 to the lower light output terminal 5, from which the light proceeds to pass through, for example, the office-B 7 in FIG. 10, to pass through the lower light input terminal 4, to pass through the transmission prism 2 again and to pass through the upper light output terminal 6, whereupon the light is transmitted to the optical switch 1 of the next office, Office-C 8. In this manner, the light signal from the office-A 10 in FIG. 10 is transmitted toward the office-D 9 through the optical fiber 11. In the normal operation, the light signal is amplified in the respective offices of the office-B 7, office-C 8 and office-D 9 so as to compensate for attenuations in the optical paths 12. When trouble develops in any of the offices, the transmission prism 2 is moved and therefore is removed from the upper optical path 12 of the optical switch 1, as illustrated in FIG. 9, such that the light is transmitted to the next office without being branched and amplified.

Since the apparatus of the first prior-art example is constructed in the above manner, it has several of the following problems: The optical transmission prism 2 is expensive and is difficult of mass produce and is necessary for the optical branching. Moreover, the apparatus becomes high in cost and large in size because of the necessity of a driving mechanism (not shown) for mechanically taking the transmission prism 2 out of the main optical path 12, as illustrated in FIG. 9, when the light amplifier section of any office has broken down. Besides, it is required to establish a unidirectional loop ring which extends from the office-A 10 via the office-B 7 and office-C 8 to the office-D 9 and then to the office-A 10 again as illustrated in FIG. 10.

Next, an optical communications apparatus in the second prior-art example stated in the official gazette of Japanese Patent Application Laid-open No. 49526/1986 will be explained with reference to an arrangement plan shown in FIG. 11.

In FIG. 11, numeral 70 designates a change-over unit, which corresponds to the optical switch 1 including the prism 2 in the first prior-art example shown in FIG. 8. Numeral 71 indicates a monitoring control unit, and numeral 72 a regeneration unit for amplifying a signal. These elements 70–72 constitute a repeater 74, which corresponds to the office-B 7 including the optical switch 1 in the first prior-art example shown in FIG. 10. The repeater 74 has the change-over unit 70 operated by a change-over control signal from an adjacent office. An optical fiber 75 is laid on the side of Office-A, and an optical fiber 76 on the side of Office-C. These optical fibers 75 and 76 correspond to the optical fiber 11 in the prior-art example shown in FIG. 10.

The optical communications apparatus of the second prior-art example thus constructed operates as follows:

Usually, the switch of the change-over unit 70 assumes a state indicated by solid lines. Under this state, the received signal from the side of the office-A is applied to the input side of the regeneration unit 72 and is amplified by the regeneration unit 72, and the amplified signal is delivered to the side of the office-C. That is, the repeater 74 functions as a downward circuit on this occasion.

The monitoring control unit 71 is normally monitoring the output signal of the regeneration unit 72. When the change-over control signal has been sent from the side of the office-A, the monitoring control unit 71 detects this change-over control signal and issues a change-over command to the change-over unit 70. The switch state of the change-over unit 70 is transferred into a state indicated by broken lines, by the change-over command. Then, the received signal from the side of the office-C is applied to the input side of the regeneration unit 72 and is amplified by the regeneration unit 72, and the amplified signal is delivered to the side of the office-A. On this occasion, the repeater 74 functions as an upward circuit.

Accordingly, the circuit is utilized for bidirectional communications as the upward and downward ones, depending upon the change-over control signals from the adjacent offices.

As stated before, the first prior-art example has had problems in that the optical transmission prism, which is expensive and difficult of mass production, is used in the construction of the offices, that the offices need to be connected by the unidirectional loop ring, and that the driving mechanism for moving the prism in case of the breakdown of any office is required, so the apparatus becomes high in cost and large in size.

Also the second prior-art example has had problems in that the change-over control signal of the optical fiber must be sent from the other office, so the procedure of communications becomes complicated, that the monitoring control unit for the change-over control signal is required in the own office, so the circuit arrangement becomes complicated, and that a driving mechanism for mechanically changing-over the optical fibers as in the first prior-art example is required, so the apparatus similarly becomes high in cost.

SUMMARY OF THE INVENTION

This invention has for its object to provide an optical communications apparatus which has a simple construction, which realizes single-line bidirectional communications and which does not hamper the transmission of a signal to another office even when the office corresponding to a given apparatus has broken down.

The optical communications apparatus of this invention consists in an optical communications apparatus of one office having a light sending device which has a plurality of coupling ends adapted to be coupled with a light transmitting optical fiber for connecting individual offices and which sends a transmission signal in the form of light, and a light receiving device which receives a light signal; said optical communications apparatus comprising light sending means including first branching optical fibers which are disposed for the respective coupling ends and each of which has its one end located at the corresponding coupling end and its other end located at a light sending portion of said light sending device, light receiving means including second branching optical fibers which are disposed for said respective coupling ends and each of which has its one end located at the corresponding coupling end and its other end associated with said light receiving device, and pass-through means for passing the light signals flowing through said respective coupling ends, to the opposite coupling ends. It is therefore possible to provide the optical communications apparatus of high reliability and low cost permitting single-line connection, which does not require a change-over signal from another office, a monitoring control unit within the own office, or an expensive optical transmission prism as well as a mechanical driving mechanism for moving the prism, which realizes a bidirectional communications system capable of optical communications in both directions, unlike a unidirectional loop ring system, and which can reliably pass the light to an adjacent office even when any office has broken down.

BRIEF DESCRIPTION OF THE DRAWINGS

Throughout the drawings, the same numerals and the same symbols indicate identical or equivalent portions.

DESCRIPTION OF THE PREFERRED EMBODIMENTS

Figure 1:
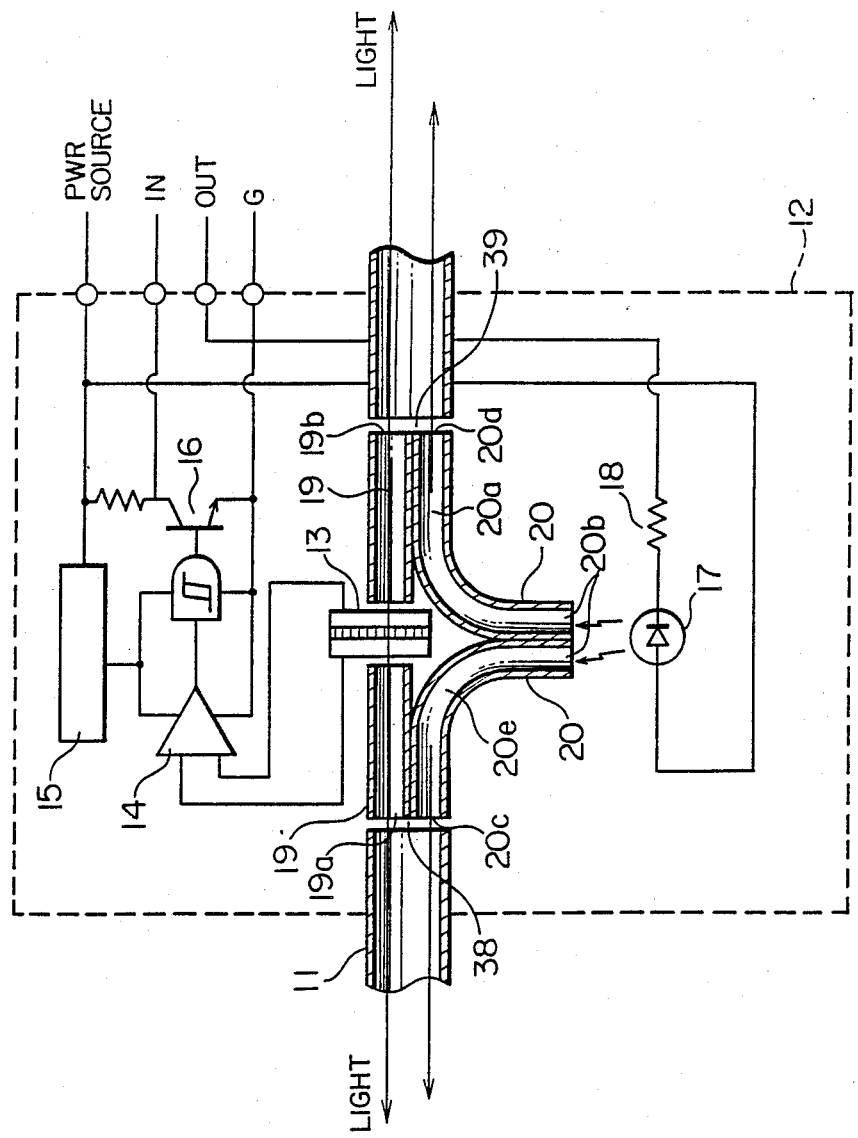
FIG. 1 is a circuit diagram showing the construction of a communications node which is the first embodiment of this invention.
Figure 2:
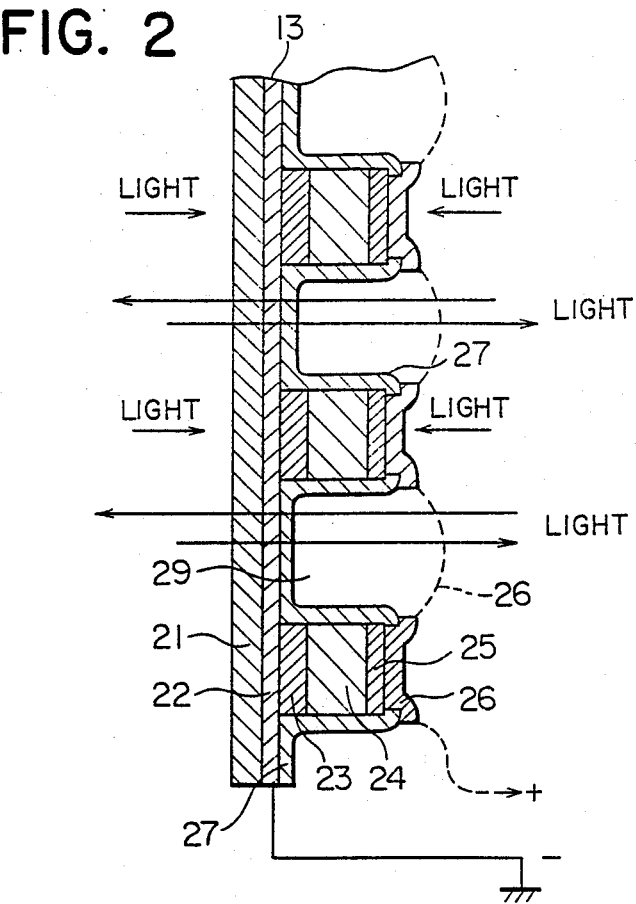
FIG. 2 is a cross-sectional view showing a photosensitive element in FIG. 1.
Figure 3:
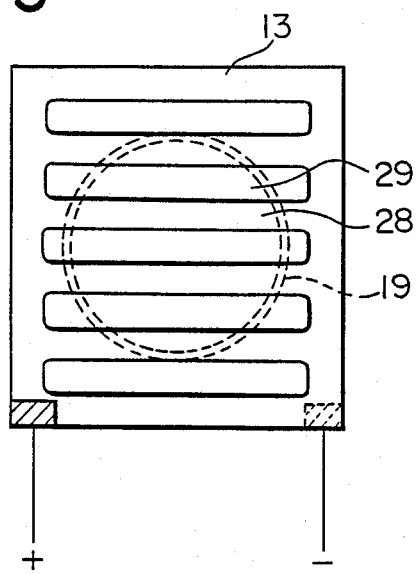
FIG. 3 is a view showing the relationship between the photosensitive element in FIG. 2 and a first optical guide.
Figure 4:
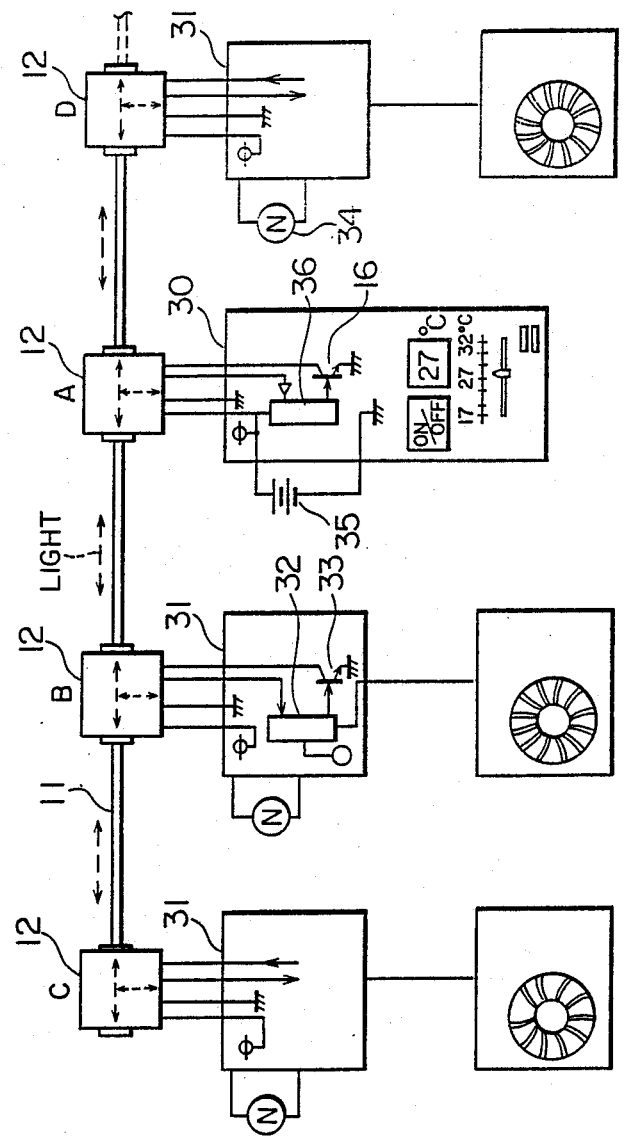
FIG. 4 is a circuit diagram showing an air-conditioner control system which employs the first embodiment of this invention.

FIG. 1 is a circuit diagram showing the arrangement of a communications node which is the first embodiment of this invention, FIG. 2 is a cross-sectional view showing the construction of an amorphous semiconductor layer element (hereinbelow, termed "photosensitive element") in FIG. 1, FIG. 3 is a view showing the relationship between the photosensitive element in FIG. 2 and a first optical guide, and FIG. 4 is a circuit diagram showing an air-conditioner control system which adopts the first embodiment of this invention. Referring to FIG. 1, numeral 12 designates a communications node which includes therein a photosensitive element 13, a light emitting element 17, a first optical guide 19, a second optical guide 20e, a third optical guide 20a, etc. The photosensitive element 13 is an element which is arranged at the middle position of the first optical guide 19 and in which amorphous semiconductor layers, having slits or reticulate pores, are stacked on a glass substrate. It is capable of receiving light from the first optical guide 19 bidirectionally, and it passes one part of the received light and photoelectrically converts the other part thereof. An electric signal generated by the photoelectric conversion of the photosensitive element 13 is amplified by an amplifier circuit 14. Numeral 15 indicates a regulated-voltage power source, and numeral 16 an output driver transistor. A light receiving device is constructed of the aforementioned photosensitive element 13, amplifier circuit 14, regulated-voltage power source 15 and output driver transistor 16, together with surrounding circuits associated with them. The light emitting element 17 functions as a light sending portion which is arranged in correspondence with one end of each of the second and third optical guides, and it is a light emitting diode (LED) by way of example. The LED 17 is energized by the electric signal which is generated by the photoelectric conversion of the photosensitive element 13 and the amplification of the amplifier circuit 14. Shown at numeral 18 is a current-limiting resistor. The first optical guide 19 functions as second branching optical fibers between which the photosensitive element 13 is arranged. One end 19a of the first optical guide is coupled with the other end 20c of the second optical guide 20e, while the other end 19b thereof is coupled with the other end 20d of the third optical guide 20a. Numerals 20 indicate first branching optical fibers configured of the second optical guide 20e which has the light emitting element 17 arranged at its one end 20b and which has its other end 20c coupled with one end 19a of the first optical guide 19, and the third optical guide 20a which has the light emitting element 17 arranged at its one end 20b and which has its other end 20d coupled with the other end 19b of the first optical guide 19. The photosensitive element 13 is connected to the electronic amplifier circuit 14, and is connected to a receiving terminal (IN) via the regulated-voltage power source 15 as well as the output driver transistor 16. In addition, a signal sending terminal (OUT) is connected in series with the current-limiting resistor 18 as well as the light emitting element 17. Here, the end at which one end 19a of the first optical guide 19 and the other end 20c of the second optical guide 20e are located, and the end at which the other end 19b of the first optical guide 19 and the other end 20d of the third optical guide 20a are located, are coupling ends 38 and 39 to which a light transmitting optical fiber 11 for connecting this communications node 12 with adjacent offices is coupled, respectively.

Referring now to FIG. 2, the photosensitive element 13 includes a glass substrate 21, on which a transparent electrode 22 of, for example, ITO (Indium Tin Oxide) is evaporated. Stacked on the transparent electrode 22 is an n-type amorphous semiconductor layer 23, a part of which is left unevaporated as pores 29 in a slitty or reticulate pattern or the like and the other part of which is formed by evaporating, for example, hydrogenated amorphous silicon doped with P (phosphorus). An undoped amorphous semiconductor layer 24 is stacked on the n-type amorphous semiconductor layer 23, and a p-type amorphous semiconductor layer 25 doped with, for example, B (boron) is stacked on the undoped amorphous semiconductor layer 24. A transparent electrode 26 opposite to the transparent electrode 22 is stacked on the p-type amorphous semiconductor layer 25 in sandwiched fashion. In order to protect the end faces of the stacked layers 23, 24, 25 and 26, a protective film 27 is formed by evaporating, for example, transparent SiO$_2$ or polyimide on the end faces. As illustrated in FIG. 2, whichever of rightward and leftward directions light is received in, a sandwich-like stacked portion where the amorphous semiconductor layers 23, 24 and 25 are stacked effects photoelectric conversion and generates a potential across the electrodes 22 and 26. Moreover, since the pore portion 29 where the amorphous semiconductor layers are not stacked is transparent, it transmits light in both the rightward and leftward directions though some transmission loss is involved.

Therefore, the photosensitive element 13 functions as a light receiving portion for receiving a light signal, and as partial guide means for passing part of the light signal. The first optical guide 19 as the second branching optical fibers functions also as third branching optical fibers which pass the light signal bidirectionally between the coupling ends 38 and 39. The photosensitive element 13 as the partial guide means and the first optical guide 19 as the third branching optical fibers constitute first pass-through means for passing the light signal flowing through one coupling end, to the other coupling end.

Meanwhile, the light signal received by the photosensitive element 13 is converted into the electric signal, which is amplified by the amplifier circuit 14. Part of the amplified signal is converted into a light signal again by the light emitting element 14, and the light signal is sent to the coupling ends 38 and 39 through the first branching optical fibers 20 of the second optical guide 20e and the third optical guide 20a. Then, the light signal is transmitted to the adjacent offices by the optical fiber 11. Accordingly, the first optical guide 19, photosensitive element 13, amplifier circuit 14, light emitting element 17, second optical guide 20e and third optical guide 20a constitute second pass-through means for passing the light signal flowing through one coupling end, to the other coupling end.

Referring now to FIG. 3, numeral 28 indicates the portion in which the amorphous semiconductor layers are stacked, and numeral 29 the pores or slits in FIG. 2. In the optical path of the optical guide 19, the photosensitive element 13 has the pores 29 and the stacked amorphous semiconductor layers-portion 28. It is accordingly understood that one part of the photosensitive element 13 passes light, while the other part thereof receives light and converts it photoelectrically.

Referring now to FIG. 4, numeral 30 designates a temperature regulating remote controller, and numeral 31 each indoor machine of, for example, an air conditioner as is an air-conditioner unit. The indoor machine 31 includes a microcomputer 32 which receives a signal from the transistor 16 and which synchronously drives a transistor 33 with a fixed pulse width and in the same communications format as that of the received signal, and it is connected to a commercial power source 34. The remote controller 30 has a battery 35, and includes a microcomputer 36.

Throughout the drawings, identical or equivalent constituents to those of the prior-art examples are denoted by the same symbols, and they shall not be repeatedly explained.

Besides, throughout the drawings, the same symbols indicate identical or equivalent portions.

Now, the operation of the first embodiment of this invention will be described with reference to FIGS. 1 thru 3.

Referring to FIGS. 1 thru 3, part of light having entered one end 19a of the first optical guide 19 from the optical fiber 11 passes through the photosensitive element 13, and it is directly sent to the optical fiber 11 through the other end 19b of the first optical guide 19. In addition, the other part of the light having entered one end 19a of the first optical guide 19 is photoelectrically converted by the photosensitive element 13, and the resulting electric signal is applied to the receiving terminal (IN) through the amplifier circuit 14 as well as the output driver transistor 16.

On the other hand, an electric signal from the signal sending terminal (OUT) is sent to the light emitting element 17 through the current-limiting resistor 18. The electric signal is converted into a light signal by the light emitting element 17, and the light is injected into one end 20b of each of the second optical guide 20e and the third optical guide 20a. The light injected into one end 20b of the second optical guide 20e is sent to the other end 20c thereof through this second optical gudie 20e, and is delivered to the optical fiber 11. Besides, the light injected into one end 20b of the third optical guide 20a is sent to the other end 20d thereof through this third optical guide 20a, and it is delivered to the optical fiber 11.

Thus, in this communications node 12, the light signals can be received in both the rightward and leftward directions, and they can also be amplified and then sent in both the rightward and leftward directions. Further, even if the power source, the light emitting element, etc. of a communications node such as the indicated node 12 has broken down, the light signal can still reach the adjacent communications node by passing through this communications node 12, and hence, the whole communications system is still capable of communication. Moreover, the communications nodes are coupled by only one optical fiber 11. With, for example, a ring system, when any of the communications nodes has broken down, the communications nodes other than the defective node can communicate with one another owing to, for example, clockwise token ring communications. Also, optical communications of bidirectional multi-bus system are permitted without employing the ring system in an optical communications system.

Next, the example in which the first embodiment of this invention is adopted for the centralized control of air conditioners will be described with reference to FIG. 4.

Referring to FIG. 4, a plurality of communications nodes 12 as described in conjunction with FIG. 1 are connected by the single optical fiber 11. The communications node A (hereinbelow, termed "Office-A") is connected to the remote controller 30, and the electric pulse signal thereof is transmitted. The adjacent office on the left side of the office-A is named Office-B, which is adjoined by Office-C, and the adjacent office on the right side of the office-A is named Office-D. Then, the indoor machine 31 of the air conditioner is electrically connected to each of the offices-B, C and D. By way of example, let's consider a case where the three indoor machines 31 of the air conditioners respectively connected to the offices-B, C and D are dispersedly arranged in a large room and where the single remote controller 30 for temperature regulation is arranged. In this case, control signals from the remote controller 30 are converted into light signals by the office-A, and the light signals are transmitted to the offices-B and D in both the leftward and rightward directions. The office-B receives the light signal of its own, for example, a signal for operating a fan motor. Besides, it receives the signal from the transistor 16 by means of the microcomputer 32, and it synchronously drives the transistor 33 with a fixed pulse width and in the same communications format as that of the received signal so as to bidirectionally send a light signal through the light emitting element 17 (not shown). The office-C receives this light signal. Here, the light is naturally returned toward the office-A. However, the superposition of light attributed to a synchronization lag etc. within the node office does not hinder the communications at all, considering such facts that the serial signal is sent only with the base-band pulse width which has been previously determined at the time of the sending of the light signal by the microcomputer 32 and that the bit rate of the communications may be a very low rate of, e.g., 1 kilobaud or less in the air-conditioner control system of this type, etc.

Here will be described the light pass-through function owing to the photosensitive element 13 (not shown) as is one of the functions of the communications node 12.

By way of example, the remote controller 30 is usually operated by the battery 35 or the like unlike the air-conditioner indoor machines 31 which can supply sufficient electric power to the node offices B, C and D owing to the commercial power source 34. On such an occasion, if information generated in the office-D is information which is to be sent to the air-conditioner indoor machines 31 of the offices-B and C without regard to the office-A of the remote controller 30, the office-A can pass the information therethrough owing to a program previously stored in the microcomputer 36 within the remote controller 30, according to which program the light pass through function of the photosensitive element 13 (not shown) is utilized, and the light emitting element 17 (not shown) of the office-A is prevented from emitting light, so as to save electric power.

In other words, the use of this communications node (communications apparatus) makes it possible that, although the office-A receives the ordinary optical communications states among the offices-A thru D, it passes light therethrough without amplifying the light and sending the light signal to the adjacent office, and that the office-A performs the required minimum optical communications only when information needs to be communicated therefrom to another office.

In addition, the single optical fiber for the optical communications control of the air conditioners may connect the individual air conditioners and the remote controller likewise to, for example, a coaxial electric-wire cable. This brings forth the great advantage of eliminating labor which is involved in constructing the so-called ring system in the conventional optical communications system.

According to the first embodiment thus far described, a photosenstive element which can receive light in both directions and which passes part of received light therethrough and converts the other part photoelectrically is arranged at the middle position of a first optical guide, a light emitting element is arranged at one end of a second optical guide as well as a third optical guide, and one end of the first optical guide and the other end of the second optical guide are coupled, while the other end of the first optical guide and the other end of the third optical guide are coupled. Therefore, the following effects are attained:

(1) Using the node office of the first embodiment of this invention, communications can be performed bidirectionally by a single optical fiber, and a ring system need not be established. Moreover, light signals can be received in both directions by a single amorphous-semiconductor photoelectric-conversion element (photoelectric element).

(2) Even if the node (communications apparatus) of one office has electrically broken down, light can be transmitted to an adjacent office by passing the light through the defective node. For such reasons, an optical communications apparatus of high reliability and low cost can be provided.

(3) Any expensive prism is not used for branching light, deriving a signal, etc., so that the apparatus is inexpensive.

In the first embodiment, the two, first and second pass-through means have been provided. There will now be described the second embodiment of this invention in which only the second pass-through means is provided and in which light receiving means and light sending means are made the same in construction.

Figure 5:
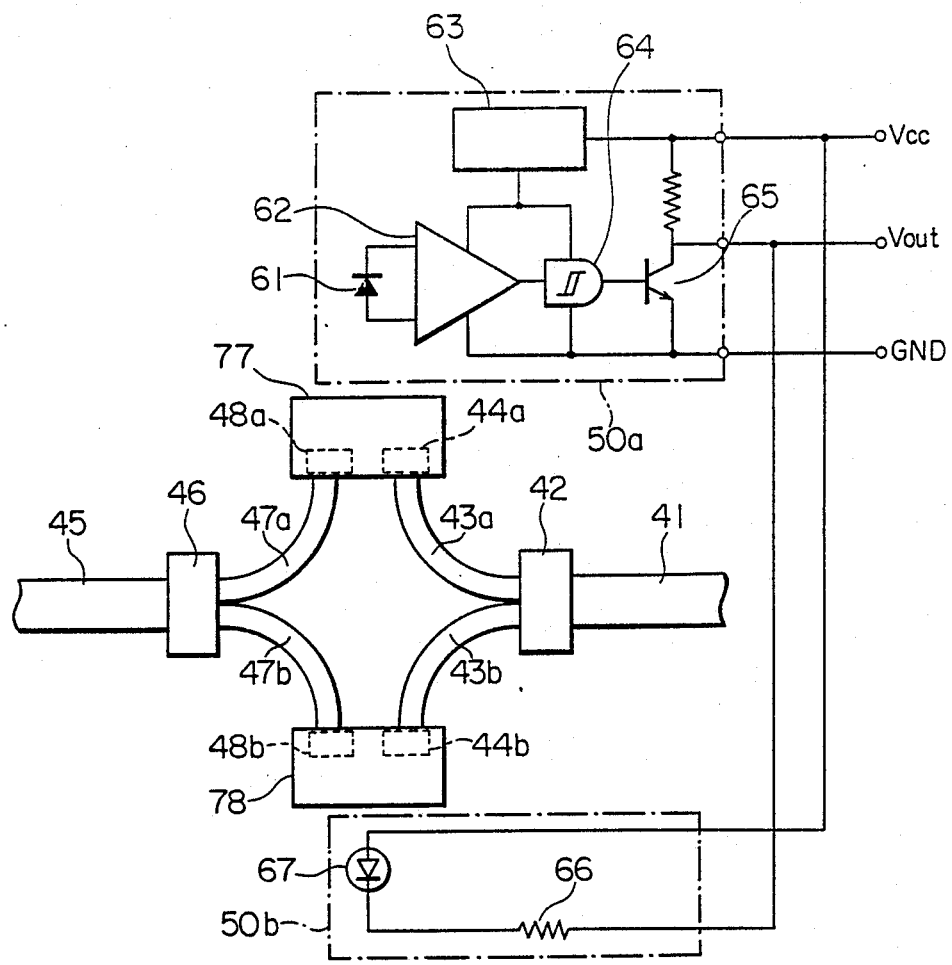
FIG. 5 is a diagram of the general construction of an optical communications apparatus which is the second embodiment of this invention.

FIG. 5 is a diagram of the general construction of an optical communications apparatus realizing single-line bidirectional communications in the second embodiment of this invention.

Referring to the figure, numeral 41 designates one optical fiber, one end of which is connected to the side of an adjacent office not shown, namely, to the side of an office corresponding to Office-C in the first embodiment. Numeral 42 designates a connector which is connected to the other end of the optical fiber 41, and which corresponds to the coupling end 39 in the first embodiment. The optical fiber 41 is bifurcated by the connector 42, to which branching optical fibers 43a and 43b are coupled. Numeral 45 indicates the other optical fiber, one end of which is connected to the side of another adjacent office not shown, namely, to the side of an office corresponding to Office-A in the first embodiment. Numeral 46 indicates a connector which is connected to the other end of the optical fiber 45, and which corresponds to the coupling end 38 in the first embodiment. The optical fiber 45 is bifurcated by the connector 46, to which branching optical fibers 47a and 47b are coupled.

A light receiving device 50a includes a photosensitive element as a light receiving portion 61, such as photodiode or phototransistor, an amplifier circuit such as operational amplifier 62 which amplifies the output of the photosensitive element 61, a regulated-voltage power source circuit 63, a threshold value circuit 64 which shapes the waveform of the output of the amplifier circuit 62 at need, and an output transistor 65. On the other hand, a light sending device 50b includes a current-limiting resistor 66 and a light emitting element as a light sending portion 67, such as light emitting diode.

A light receiving portion 44a receives the light signal of the branching optical fiber 43a, while a light receiving portion 48a receives the light signal of the branching optical fiber 47a, and a light sending unit 77 sends the light signals received by the light receiving portions 44a and 48a, to the photosensitive element 61 of the light receiving device 50a. Therefore, the branching optical fibers 43a and 47a construct first branching optical fibers each of which has its one end located at the corresponding coupling end and its other end located at the light sending portion of the light sending device.

A light receiving unit 78 receives a light signal emitted from the light emitting element 67 which is the light sending portion of the light sending device 50b, and a light sending portion 44b sends the light signal received by the light receiving unit 78, to the branching optical fiber 43b, while a light sending portion 48b sends the light signal received by the light receiving unit 78, to the branching optical fiber 47b. Therefore, the branching optical fibers 43b and 47b construct second branching optical fibers each of which has its one end located at the corresponding coupling end and its other end associated with the light receiving device.

The light receiving device 50a and the light sending device 50b constitute signal sending/receiving means for amplifying the light signal derived from the photosensitive element 61, through the amplifier circuit 62 and then delivering an output from the light emitting element 67 of the signal sending device 50b. Therefore, the second embodiment described here comprises the second pass-through means in the first embodiment.

The general operation of the optical communications apparatus capable of single-line bidirectional communications constructed as described above proceeds as follows:

A light signal sent through one optical fiber 41 is branched into the two branching optical fibers 43a and 43b through the connector 42. The branched light signal is photo-coupled with the light receiving device 50a via the light receiving portion 44a and is converted by the light receiving device 50a into an electric signal, which is amplified and is binary-coded if necessrary. The electric signal having been binary-coded in the light receiving device 50a is delivered as an output from the light sending device 50b. The light signal produced from the light sending device 50b is delivered to the light sending portion 48b located at the end of the branching optical fiber 47b bifurcated from the other optical fiber 45, whereby the light signal is sent to the other optical fiber 45.

Likewise, a light signal sent through the other optical fiber 45 is branched into the two branching optical fibers 47a and 47b through the connector 46. The branched light signal is photo-coupled with the light receiving device 50a via the light receiving portion 48a, and a binary-coded electric signal obtained in the light receiving device 50a is delivered as an output from the light sending device 50b. The light signal produced from the light sending device 50b is delivered to the light sending portion 44b located at the end of the branching optical fiber 43b, whereby the light signal is sent to the optical fiber 41.

In this manner, the second embodiment comprises the pair of optical fibers 41 and 45 each of which has its one end connected to the side of the adjacent office and its other end bifurcated, and the signal sending/receiving means configured of the light receiving device 50a, the light sending device 50b, etc., in which the ends of the pair of bifurcated optical fibers 41 and 45 are collectively divided into two groups, one of the groups is used as the signal receiving ends while the other is used as the signal sending ends, and the light signals obtained from the signal receiving ends are amplified and are delivered to the signal sending ends. It is accordingly possible to perform the single-line bidirectional optical communications in the direction from the optical fiber 41 to the optical fiber 45, and vice versa. On this occasion, any of the monitoring control means, the change-over means, etc. for the bidirectional communications as in the prior art is not required.

In the second embodiment, all the ends of the pair of bifurcated optical fibers 41 and 45 are collectively used for sending and receiving the signals, but it is also possible to separate and amplify the light signals in both the directions.

Moreover, in the second embodiment, the received signal is resent while being used in the receiving office. Therefore, even when the received signal is not utilized in the receiving office due to the breakdown thereof, the same signal can be reliably sent to both the adjacent offices.

As thus far described, the optical communications apparatus of the second embodiment of this invention consists in that a plurality of pairs of optical fibers each being connected to the side of an adjacent office at one end thereof and bifurcated at the other end thereof have the ends collectively divided into two groups, that one of the two groups is used for receiving signals, while the other is used for sending signals, and that the light signals obtained from the signal receiving ends are amplified and delivered to the signal sending ends by signal sending/receiving means. Therefore, the bifurcation of the end of each optical fiber makes it possible to use one branch for receiving the signal and the other branch for sending the signal, and bidirectional communications are permitted without employing monitoring control means, change-over means, etc. therefor.

Meanwhile, the second embodiment is equipped with one receiving device and one sending device. However, the numbers of the devices are not restrictive, but a plurality of sets may well be provided for each of the devices as are needed. Such an example is illustrated as the third embodiment of this invention in FIG. 6.

Figure 6:
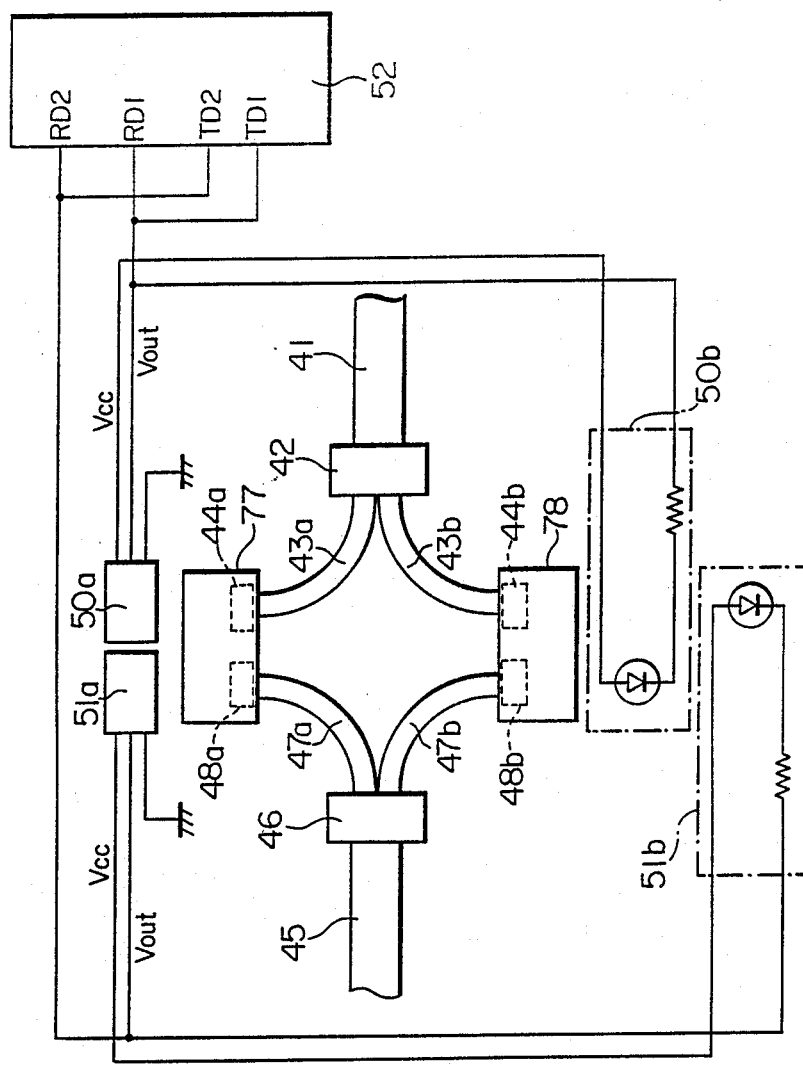
FIG. 6 is a diagram of the general construction of an optical communications apparatus which is the third embodiment of this invention.

FIG. 6 is a diagram of the general construction of an optical communications apparatus realizing single-line bidirectional communications in the third embodiment of this invention. In the figure, the same symbols as in the second embodiment; 41, 42, 43a, 43b, 44a, 44b, 45, 46, 47a, 47b, 48a, 48b, 50a, 50b, 77 and 78 denote identical portions, respectively, and they shall not be explained.

Symbol 51a indicates a second light receiving device which has the same structure and the same function as those of the first light receiving device 50a, while symbol 51b indicates a second light sending device which has the same structure and the same function as those of the first light sending device 50b. In addition, numeral 52 designates a microcomputer. As in the foregoing, the second light receiving device 51a and the second light sending device 51b constitute signal sending/receiving means for amplifying a light signal obtained from a photosensitive element 61, through an amplifier circuit 62 and delivering an output from the light emitting element 67 of the signal sending device 51b, so that they form the second pass-through means of the first embodiment likewise to the first light receiving device 50a and the first light sending device 50b.

The general operation of the optical communications apparatus capable of single-line bidirectional communications constructed as described above proceeds as follows:

A light signal sent through one optical fiber 41 is branched into the two branching optical fibers 43a and 43b through the connector 42. The branched light signal is photo-coupled with the first light receiving device 50a via the light receiving portion 44a and is converted by the first light receiving device 50a into an electric signal, which is amplified and is binary-coded. The electric signal is converted into a light signal by the light emitting element of the first light sending device 50b, and the light signal is sent from the first light sending device 50b to the light receiving portion 48b located at the end of the branching optical fiber 47b, whereby the light signal is sent to the other optical fiber 45.

Besides, a light signal sent through the other optical fiber 45 is branched into the two branching optical fibers 47a and 47b through the connector 46. The branched light signal is photo-coupled with the second light receiving device 51a via the light receiving portion 48a, and it is converted by the second light receiving device 51a into an electric signal, which is amplified and binary-coded. The electric signal is converted into a light signal by the light emitting element of the second light sending device 51b, and the light signal is sent from the second light sending device 51b to the light sending portion 44b located at the end of the branching optical fiber 43b, whereby the light signal is sent to one optical fiber 41.

On this occasion, the outputs of the first light receiving device 50a and the second light receiving device 51a are respectively applied to the receiving input terminals (RD1) and (RD2) of the microcomputer 52 so as to decode the signals. If the signals need to be transmitted to other offices, they are respectively transmitted from the transmitting output terminals (TD1) and (TD2) of the microcomputer 52 on the idle times of the optical fibers 41 and 45. Then, the signals can be simultaneously sent to the respective optical fibers 41 and 45 in both directions by the first and second light receiving devices 50a and 51a.

In this manner, the optical communications apparatus realizing the single-line bidirectional communications in the third embodiment comprises the pair of optical fibers 41 and 45 each of which has its one end connected to the side of the adjacent office and its other end bifurcated, and the amplification means configured of the first light receiving device 50a, the second light receiving device 51a, etc., in which the ends of the bifurcated branching optical fibers 43a, 43b and 47a, 47b are used on one side for receiving the signals of the optical fibers 41 and 45 and on the other side for sending the signals of the optical fibers 45 and 41, and the output signals applied from the signal receiving ends are converted into the electric signals to be supplied to the signal sending ends, the electric signals being amplified and being binary-coded if necessary.

Accordingly, the signal is received from the signal receiving end of one optical fiber, and it is independently amplified by the amplification means and is sent to the signal sending end of the other optical fiber, while at the same time or in time-division fashion, the signal is received from the signal receiving end of the other optical fiber, and it is independently amplified by the amplification means and is sent to the signal sending end of one optical fiber. Therefore, the bidirectional signals can be amplified and controlled independently. Moreover, none of monitoring control means, change-over means, etc. for the bidirectional communications is required.

Meanwhile, the signal sending/receiving means of the optical communications apparatus capable of the single-line bidirectional communications in the third embodiment is constructed of a light receiving unit which is configured of a photosensitive element, an amplifier circuit and a threshold value or binary-coding circuit, and a light sending unit which is configured of a current-limiting resistor and a light emitting element. In performing the present invention, however, the signal sending/receiving means can also be constructed of the photosensitive element, the amplifier circuit and the light emitting element, and the threshold value circuit may be disposed at need because it performs wave-shaping for pulse transmission.

Moreover, in the third embodiment, it is carried out in each of the two pairs of receiving devices and sending devices that the received signal is resent while being used in the receiving office, in other words, the second pass-through means of the first embodiment are comprised in a number of two. As in the second embodiment, therefore, even when the received signal is not utilized in the receiving office due to the breakdown thereof, the same signal can be reliably sent to both the adjacent offices. Furthermore, even when the receiving device and the sending device in one pair have broken down, the same signal can be sent to both the adjacent offices.

As thus far described, the third embodiment of this invention consists in that the ends of a pair of optical fibers each being connected to the side of an adjacent office at one end thereof and bifurcated at the other end thereof are used on one side for receiving the signals of the opposite optical fibers and on the other side for sending the signals of the opposite optical fibers, and that the output signals applied from the signal receiving ends are amplified and delivered to the signal sending ends by signal sending/receiving means. Accordingly, the same effects as in the preceding embodiment can be attained, and since the light signals can be amplified in individual directions by the signal sending/receiving means, bidirectional optical communications can be performed by a single line.

The probability at which both the two pairs of sending devices and receiving devices in the third embodiment break down is very low, but such breakdown is apprehended on rare occasions. Therefore, an example in which the third embodiment is additionally equipped with the first pass-through means of the first embodiment is illustrated as the fourth embodiment of this invention in FIG. 7.

Figure 7:
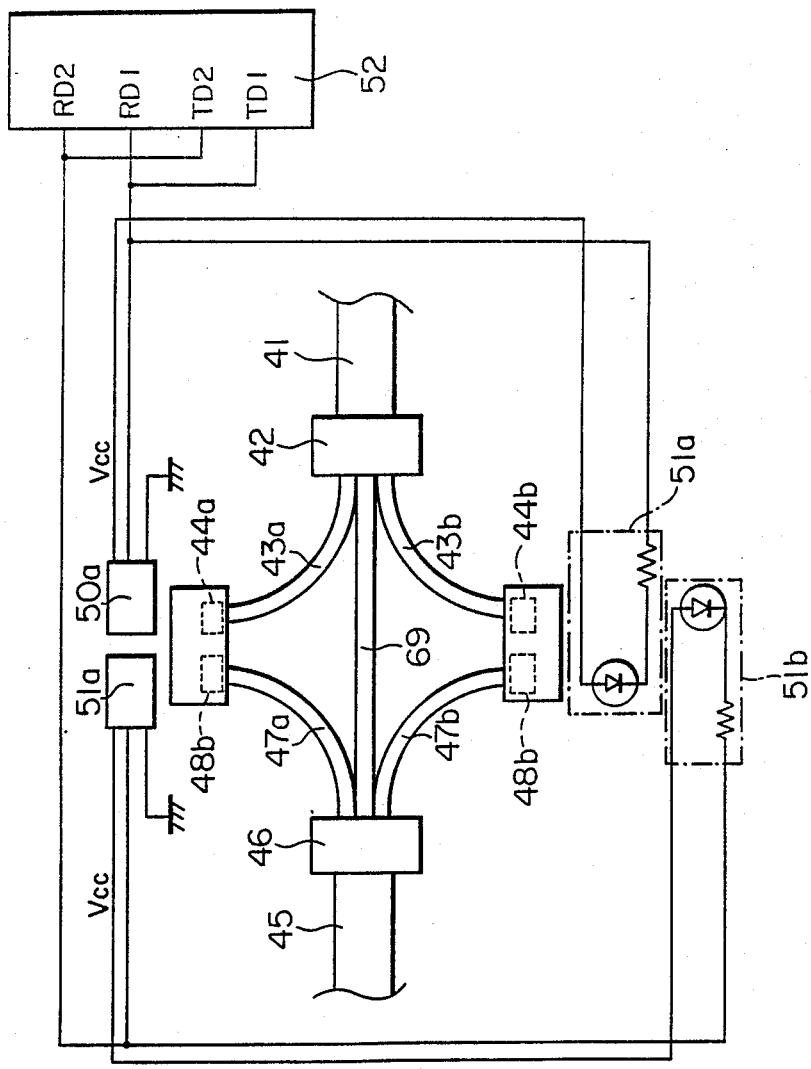
FIG. 7 is a diagram of the general construction of an optical communications apparatus which is the fourth embodiment of this invention.
Figure 8:
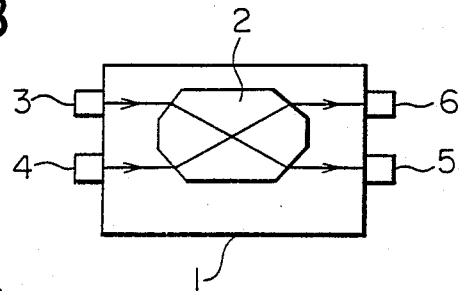
FIG. 8 is a plan view of a branching communications apparatus in a first prior-art example, showing the state in which a prism is inserted in optical paths.
Figure 9:
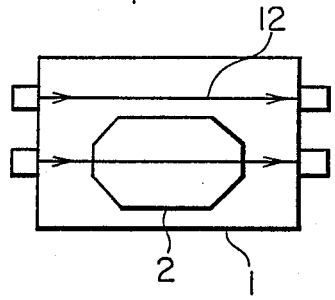
FIG. 9 is a plan view showing the state in which the prism in FIG. 8 is taken off from one of the optical paths.
Figure 10:
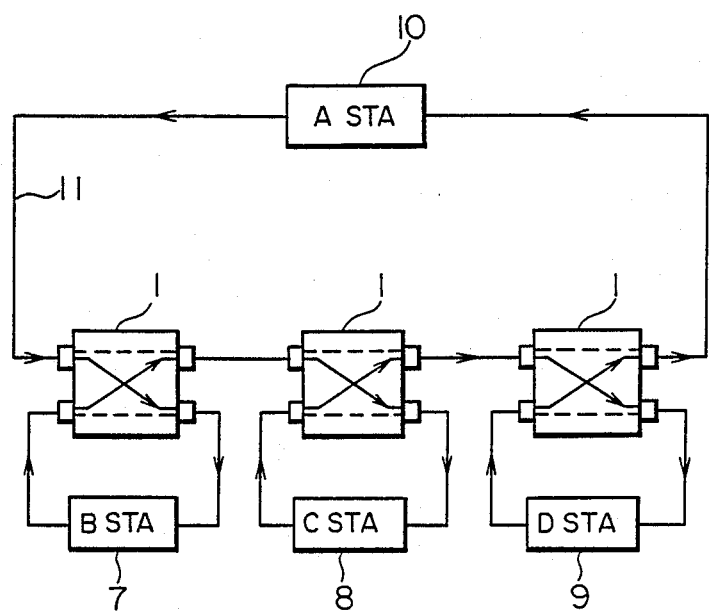
FIG. 10 is an arrangement diagram showing an optical transmission system in the first prior-art example.
Figure 11:
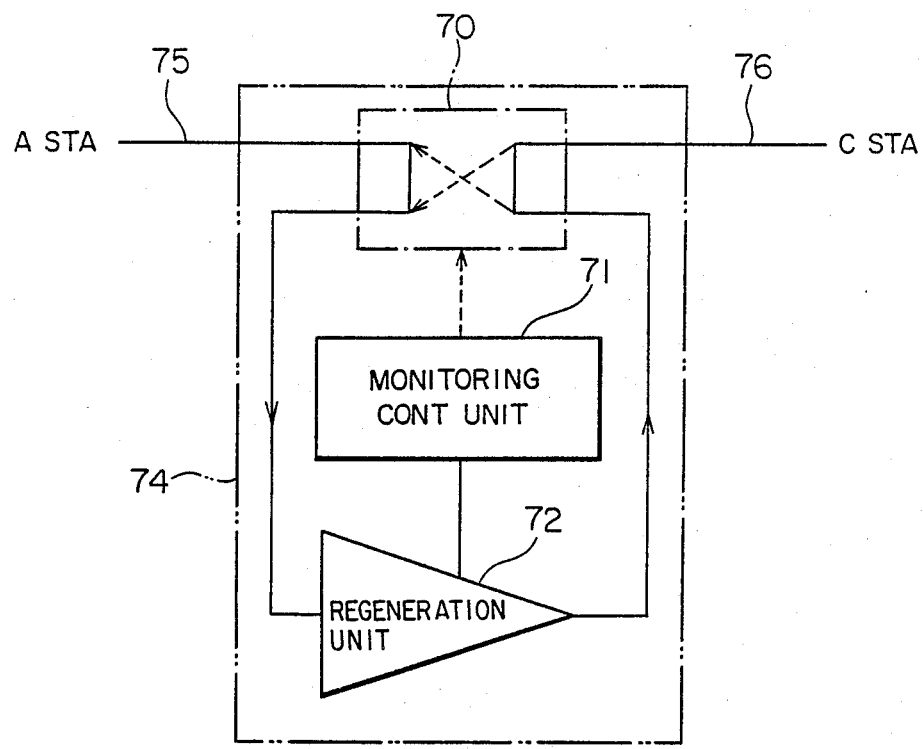
FIG. 11 is a diagram of the construction of an optical communications apparatus in a second prior-art example.

FIG. 7 is a diagram of the general construction of an optical communications apparatus realizing single-line bidirectional communications in the fourth embodiment of this invention. In the figure, the same symbols as in the third embodiment denote portions of identical constructions and identical functions, respectively, and they shall not be explained.

The difference of the fourth embodiment in FIG. 7 from the third embodiment in FIG. 6 lies only in that a branching optical fiber 69 which functions as the first pass-through means of the first embodiment is extended across the connector 2 and the connector 46. Owing to the provision of the branching optical fiber 69 for the first pass-through means in this manner, a light signal having entered from an adjacent office through the optical fiber 41 or 45 is branched into the three branching optical fibers 43a, 43b, 69 or 47a, 47b, 69, and the light introduced into the branching optical fiber 69 pass therethrough directly and is transmitted to the opposite office.

Therefore, not only in a case where the receiving office has broken down, but also even in a case where all the pairs of receiving devices and sending devices have broken down, the light signal is directly transmitted to the adjacent office by the branching optical fiber 69. Normal communications are performed in the whole network except the defective office by connecting the adjacent offices through the single optical fiber and without the necessity of looping the fiber. Accordingly, the same functional effects as in the first embodiment are achieved.

As set forth above, the optical communications apparatus of this invention consists in an optical communications apparatus of one office having a light sending device which has a plurality of coupling ends adapted to be coupled with a light transmitting optical fiber for connecting individual offices and which sends a transmission signal in the form of light, and a light receiving device which receives a light signal; comprising light sending means including first branching optical fibers which are disposed for the respective coupling ends and each of which has its one end located at the corresponding coupling end and its other end located at a light sending portion of said light sending device, light receiving means including second branching optical fibers which are disposed for said respective coupling ends and each of which has its one end located at the corresponding coupling end and its other end associated with said light receiving device, and pass-through means for passing the light signals flowing through said respective coupling ends, to the opposite coupling ends. Therefore, the invention achieves the special effect of providing the optical communications apparatus of high reliability and low cost permitting single-line connection in which a change-over signal from another office, a monitoring control unit in the own office, or an expensive optical transmission prism as well as a mechanical drive mechanism for moving the prism is not required, a bidirectional communications system capable of optical communications in both directions is realized unlike a unidirectional loop ring system, and even in case of the breakdown of any office, light can be reliably passed through the office to the adjacent office.

What is claimed is:

1. In an optical communications apparatus of one office having a light sending device which has a plurality of coupling ends adapted to be coupled with a light transmitting optical fiber for connecting individual offices and which sends a transmission signal in the form of light, and a light receiving device which receives a light signal;

an optical communications apparatus characterized by comprising light sending means including first branching optical fibers which are disposed such that respective coupling ends of said fibers are coupled such that each of said ends of said first branching optical fiber has one end located at a corresponding coupling end and an other end located at a light sending portion of said light sending device;

a light receiving means including second branching optical fibers which are disposed such that the ends of said second branching optical fiber has respective coupling ends and wherein each said ends of second fiber has one end located at the corresponding coupling end and an other end associated with said light receiving device; and pass-through means for passing the light signals flowing through said respective coupling ends, to an opposite coupling end by delivering light signals received by said light receiving device through said light rendering means, to said plurality of coupling ends through said light sending device and said light sending means.

2. An optical communications apparatus as defined in claim 1, wherein third branching optical fibers are employed as said pass-through means.

3. An optical communications apparatus as defined in claim 2, wherein said second branching optical fibers are used also as said third branching optical fibers, and partial guide means for guiding part of light to pass through each of said second branching optical fibers, to another of said second branching optical fibers is provided near the other end of said each second branching optical fiber.

4. An optical communications apparatus as defined in claim 3, wherein said partial guide means is constructed in such a way that the light is passed through a part of a photosensitive element of said light receiving device.

5. An optical communications apparatus as defined in claim 4, wherein said photosensitive element includes transparent electrodes.

6. An optical communications apparatus as defined in claim 5, wherein said photosensitive element is an element in which amorphous semiconductor layers in a pattern such as slitty or reticulate pattern are stacked on a glass substrate.

7. An optical communications apparatus as defined in claim 1, wherein said light sending portion of said light sending device comprises a light emitting device.

8. An optical communications apparatus as defined in claim 7, wherein said light emitting device comprises: a light emitting diode.

9. An optical communications apparatus as defined in claim 1, wherein the light signal received by said light receiving device is amplified and then delivered to said light sending device.

* * * * *